(12) United States Patent
Uchitomi et al.

(10) Patent No.: US 7,316,862 B2
(45) Date of Patent: *Jan. 8, 2008

(54) ACTIVE MATERIAL FOR ELECTRODE AND NON-AQUEOUS SECONDARY BATTERY USING THE SAME

(75) Inventors: Kazutaka Uchitomi, Settsu (JP); Atsushi Ueda, Hirakata (JP); Shigeo Aoyama, Otsu (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 353 days.

This patent is subject to a terminal disclaimer.

(21) Appl. No.: 10/717,772

(22) Filed: Nov. 20, 2003

(65) Prior Publication Data

US 2004/0110063 A1    Jun. 10, 2004

(30) Foreign Application Priority Data

Nov. 21, 2002 (JP) ............................. 2002-338430

(51) Int. Cl.
*H01M 4/00* (2006.01)

(52) U.S. Cl. ................. 429/128; 429/209; 429/223; 429/224; 429/231.3; 429/231.95; 429/233; 429/235

(58) Field of Classification Search ............... 429/128, 429/209, 223, 224, 231.3, 231.95, 233, 235
See application file for complete search history.

(56) References Cited

U.S. PATENT DOCUMENTS

| | | | |
|---|---|---|---|
| 5,429,800 A * | 7/1995 | Miraldi et al. ............... 422/26 |
| 5,718,989 A | 2/1998 | Aoki et al. ................. 429/218 |
| 5,795,558 A | 8/1998 | Aoki et al. ................. 423/594 |
| 6,015,447 A * | 1/2000 | Gorge et al. .................. 75/255 |
| 6,040,090 A | 3/2000 | Sunagawa et al. ..... 429/231.95 |
| 6,045,771 A | 4/2000 | Matsubara et al. |
| 6,416,902 B1 * | 7/2002 | Miyasaka ................... 429/223 |
| 6,551,744 B1 | 4/2003 | Ohzuku et al. ............. 429/223 |
| 6,555,268 B1 * | 4/2003 | Inoue et al. ................. 429/217 |
| 6,808,848 B2 | 10/2004 | Nakanishi et al. |
| 6,964,828 B2 | 11/2005 | Lu et al. |
| 2002/0086210 A1 | 7/2002 | Naruoka et al. ............. 429/223 |
| 2003/0082452 A1 | 5/2003 | Ueda et al. ............... 429/231.1 |
| 2003/0087154 A1 | 5/2003 | Ohzuka et al. |
| 2003/0170540 A1 | 9/2003 | Ohzuku et al. |
| 2003/0180617 A1 | 9/2003 | Fujimoto et al. |
| 2004/0023113 A1 | 2/2004 | Suhara et al. |

FOREIGN PATENT DOCUMENTS

| | | | |
|---|---|---|---|
| EP | 1 189 296 A2 | 3/2001 |
| EP | 1 372 202 A1 | 12/2003 |
| EP | 1 391 950 A1 | 2/2004 |
| JP | 8-37007 | 2/1996 |
| JP | 11-25957 | 1/1999 |
| JP | 11-307094 A | 11/1999 |
| JP | 2000-82466 A | 3/2000 |
| JP | 2000-223122 | 8/2000 |
| JP | 2002-42813 | 2/2002 |
| JP | 2002-100357 | 4/2002 |
| JP | P2002-110253 A | 4/2002 |
| JP | WO 02/40404 A1 | 5/2002 |
| JP | 2002-304993 | 10/2002 |
| JP | 2002-319398 A | 10/2002 |
| JP | 2003-68299 A | 3/2003 |
| WO | WO-01/92158 A1 | 12/2001 |
| WO | WO-02/073718 A1 | 9/2002 |
| WO | WO-02/078105 A1 | 10/2002 |
| WO | WO-02/086993 A1 | 10/2002 |

OTHER PUBLICATIONS

Patent Abstracts of Japan; Publication No. 08037007 A dated Feb. 6, 1996 (1 pg.).
Patent Abstracts of Japan; Publication No. 2000-223122 dated Aug. 11, 2000 (1 pg.).
Patent Abstracts of Japan; Publication No. 2002-304993 dated Oct. 18, 2002 (1 pg.).
Patent Abstracts of Japan; Publication No. 2002-100357 dated Apr. 5, 2002 (1 pg.).
Patent Abstracts of Japan; Publication No. 2002-110253; Dated Apr. 12, 2002; 1 page.
T. Ohzuku et al., Chemistry Letters 2001, pp. 642-643.
Z. Lu et al., Electrochemical and Solid-State Letters, vol. 4, No. 12, pp. A200-A203, 2001.

* cited by examiner

*Primary Examiner*—Patrick Ryan
*Assistant Examiner*—Jane Rhee
(74) *Attorney, Agent, or Firm*—Birch, Stewart, Kolasch & Birch, LLP

(57) ABSTRACT

A lithium-containing complex oxide represented by General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn) is provided. The lithium-containing complex oxide contains secondary particles formed of flocculated primary particles. The primary particles have a mean particle diameter of 0.3 to 3 μm, and the secondary particles have a mean particle diameter of 5 to 20 μm. By using this lithium-containing complex oxide as a positive active material, a non-aqueous secondary battery having a high capacity, excellent cycle durability and excellent storage characteristics at a high temperature is achieved.

26 Claims, No Drawings

ACTIVE MATERIAL FOR ELECTRODE AND NON-AQUEOUS SECONDARY BATTERY USING THE SAME

BACKGROUND OF THE INVENTION

1. Field of the Invention

The present invention relates to an active material for an electrode that can be used for a positive active material of a non-aqueous secondary battery and a non-aqueous secondary battery whose cycle characteristics and storage characteristics at a high temperature are improved by using such an active material for a positive electrode.

2. Description of Related Art

In recent years, along with the development of portable electronic equipment such as mobile phones and notebook computers, and the commercialization of electric vehicles, there is an increasing demand for a miniaturized and lightweight secondary battery with a high capacity. At present, as a secondary battery with a high capacity satisfying this demand, a non-aqueous secondary battery using $LiCoO_2$ as a positive electrode material and a carbon material as a negative active material is being commercialized. Such a non-aqueous secondary battery has a high energy density, and can be miniaturized and reduced in weight, so that it has been paid attention to as a power source of portable electronic equipment. Since $LiCoO_2$ used as a positive electrode material of the non-aqueous secondary battery is easy to produce and handle, it is often used as a preferable active material. However, $LiCoO_2$ is produced using Co, which is rare metal, as a material. Therefore, it is conceivable that a material shortage will become serious in the future. Furthermore, the price of Co is high and fluctuates greatly, so that it is desired to develop a positive electrode material that can be supplied stably at a low cost.

In view of the above, complex oxide materials of a lithium-manganese oxide type containing Mn, which can be supplied stably at a low cost, as a constituent element hold great promise. Among them, $LiMn_2O_4$ with a Spinel structure, which can be charged/discharged in a voltage range in the vicinity of 4 V against Li metal, and $LiMnO_2$ with a layered structure are being investigated. In particular, lithium-containing complex oxides obtained by substituting a part of Mn of the above-noted $LiMnO_2$ with Ni, Co, Al etc. are expected to be a prospective substitute for $LiCoO_2$ (see paragraphs 0027 to 0029 of JP 8(1996)-37007 A, paragraphs 0003 to 0008 of JP 11(1999)-25957 A and paragraphs 0002 to 0009 of JP 2000-223122 A).

However, when the detailed study of this complex oxide obtained by substituting a part of Mn of the above-noted $LiMnO_2$ with Ni, Co etc. was conducted by the inventors of the present invention, it was found that the properties such as the structure and characteristics are changed remarkably due to the composition of a compound, in particular, the ratio of quantity of Li to other metallic elements, the kind and quantity ratio of substitute elements, and the synthesis process in which the complex oxide is formed.

Especially in the case of Ni substitution, due to the quantity ratio of Mn to Ni and the quantity ratio of these elements to other substitute elements, the property of the complex oxide to be synthesized varies greatly. Thus, unless the quantity ratio of Mn to Ni is about 1:1 and that of Mn and Ni to other substitute elements is in a certain range, it was not possible to obtain a homogenous compound with an excellent property. Also, depending on the quantity ratio of Mn and other substitute elements to Li, the true density of the complex oxide varies greatly.

Moreover, the form of particles in the above-described lithium-containing complex oxide considerably influences battery characteristics.

SUMMARY OF THE INVENTION

The present invention was made as a result of studies to solve the problems described above and provides a non-aqueous secondary battery that has a large capacity and is excellent in durability under charge/discharge cycles and in storage characteristics at a high temperature, by using a lithium-containing complex oxide having a layered structure in a limited composition range and a specific particle form as an active material for positive electrode.

In one aspect, an active material for electrode according to the present invention is a lithium-containing complex oxide represented by General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn). The lithium-containing complex oxide contains secondary particles formed of flocculated primary particles. The primary particles have a mean particle diameter of 0.3 to 3 μm, and the secondary particles have a mean particle diameter of 5 to 20 μm.

Further, an active material for electrode according to one aspect of the present invention contains a lithium-containing complex oxide A and a lithium-containing complex oxide B. The lithium-containing complex oxide A is represented by General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn). The lithium-containing complex oxide A contains secondary particles formed of flocculated primary particles, and the secondary particles have a mean particle diameter of 5 to 20 μm. The lithium-containing complex oxide B has a mean particle diameter smaller than the mean particle diameter of the secondary particles of the lithium-containing complex oxide A.

In addition, in one aspect, a non-aqueous secondary battery according to the present invention includes a positive electrode containing the above-described active material for electrode, a negative electrode, and a non-aqueous electrolyte.

DESCRIPTION OF THE PREFERRED EMBODIMENTS

Hereinafter, the present invention will be described in more detail by way of embodiments. The lithium-containing complex oxide serving as an active material for electrode according to the present invention is represented by General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn), and contains secondary particles formed of flocculated primary particles. The primary particles have a mean particle diameter of 0.3 to 3 μm, and the secondary particles have a mean particle diameter of 5 to 20 μm.

In other words, the lithium-containing complex oxide of the present invention is a complex oxide in a very limited composition range based on a composition containing at least Ni and Mn as constituent elements, in which the quantity ratio of Ni to Mn is 1:1.

In the present invention, the reason why the above-mentioned limited composition range is preferred is as follows. In a lithium-containing complex oxide with a layered structure containing Ni and Mn, based on the composition represented by General Formula: $LiNi_{1/2}Mn_{1/2}O_2$ in which the quantity ratio of Ni to Mn is 1:1, Li is substituted for Ni and Mn by x/2, respectively, the quantity ratio of Ni to Mn is shifted from 1/2:1/2 by $\delta/2$ and $-\delta/2$, respectively, the quantity ratio of Li has a width of $\alpha$, and an element M (where M is at least one element selected from the group consisting of Mg, Ti, Cr, Fe, Co, Cu, Zn, Al, Ge, Zr and Sn) is substituted for Ni and Mn by y/2, respectively; that is, in a composition range represented by General Formula: $Li_{1+x+\alpha}Ni_{(1-x-y+\delta)/2}Mn_{(1-x-y)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn), a complex oxide is obtained whose crystal structure is stabilized and which is excellent in reversibility of charging/discharging and durability during charge/discharge cycles in a potential range in the vicinity of 4 V.

This is believed to be caused by the following: the average valence of Mn in the complex oxide has a value in the vicinity of 4 (about 3.3 to 4); and movement of Mn in the crystal is suppressed in the course of doping of Li and removal of Li during charging/discharging. However, no limitation on the scope of the present invention is intended by these postulated mechanisms.

Also, in the case where y>0 and at least Co is contained as the element M, the electrical conductivity of the compound increases, and the load characteristics during large-current discharging improve.

According to a more detailed composition investigation, it was also found that the stability of the compound improves in the vicinity of the composition in which the quantity ratio of Ni, Mn and M is 5:5:2, i.e., the composition represented by General Formula: $LiNi_{5/12}Mn_{5/12}M_{1/6}O_2$ or in the vicinity of the composition in which the ratio is 1:1:1, i.e., the composition represented by General Formula: $LiNi_{1/3}Mn_{1/3}M_{1/3}O_2$.

The complex oxide used in the present invention has a large true density of 4.55 to 4.95 g/cm³ and a high volume energy density. Although the true density of a complex oxide containing Mn in a certain range varies largely depending on the composition thereof, the true density of the complex oxide of the present invention is considered to be brought close to that of $LiCoO_2$ because its structure is stabilized and a single phase is likely to be formed in the above-noted narrow composition range. Particularly in the case of a composition close to a stoichiometric ratio, such as $x \leq 0.05$ and $x+\alpha \leq 0.05$, the true density becomes a large value, and in $-0.015 \leq x+\alpha \leq 0.015$, a high-density complex oxide of about 4.7 g/cm³ or more is obtained.

In the above General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn), the quantity ratio of Ni to Mn has to be 1:1 basically, and only a small shift ($\delta/2$) from the median value, i.e., $-0.1 \leq \delta \leq 0.1$ can be permitted. However, in the composition range of $0.2 < y \leq 0.4$, the stability of the crystal structure becomes higher, and a single phase is likely to be formed. As a result, even if a shift in that quantity ratio increases, an intended complex oxide can be obtained. Therefore, in the above General Formula, although the basic allowable range of $\delta$ is as narrow as $-0.1 \leq \delta \leq 0.1$, the range of $\delta$ may be expanded to $-0.24 \leq \delta \leq 0.24$ when $0.2 < y \leq 0.4$.

Herein, the reason why the upper limit of y is set to be 0.4 is that when the composition at y>0.4, i.e., the substitution amount by the element M exceeds 0.4, a heterogeneous phase is likely to be formed in an intended complex oxide, impairing the stability of the compound.

As a form of the complex oxide having the above-noted composition, a complex oxide containing secondary particles formed of flocculated primary particles is selected, where the primary particles have a mean particle diameter of 0.3 to 3 µm and the secondary particles have a mean particle diameter of 5 to 20 µm. This is because in the complex oxide of secondary particles formed of flocculated primary particles, the reactivity in charging/discharging and the filling property of the complex oxide can be enhanced. Here, the mean particle diameter of 0.3 to 3 µm of the primary particles enhances the reactivity in charging/discharging to further improve the load characteristics of a battery, while the mean particle diameter of 5 to 20 µm of the secondary particles enhances the filling property of the complex oxide to increase the battery capacity.

Moreover, it is desirable that the above-described complex oxide has a BET specific surface area ranging from 0.3 to 2 m²/g. This is because a complex oxide with a BET specific surface area of 0.3 m²/g or more has an excellent reactivity, and that with a BET specific surface area of 2 m²/g or less has a high density of the particles themselves, achieving a large electrode mixture density after the electrode is formed.

The lithium-containing complex oxide in the above-described particle form can be obtained by pouring an alkali aqueous solution into an aqueous solution in which, for example, salts of Ni and Mn or those of Ni, Mn and the element M are dissolved, synthesizing a coprecipitated hydroxide of Ni and Mn or that of Ni, Mn and the element M so as to be burnt with a lithium compound, and further mechanically pulverizing and putting the synthesized complex oxide through a sieve, as necessary. It is desirable that the burning is carried out in an atmosphere containing at least 10% by volume of oxygen such as the air or oxygen gas. In general, the burning temperature is about 700° C. to 1100° C., and the burning period is 1 to 24 hours. It is preferable that, before the burning, preheating at a temperature lower than the burning temperature (about 250° C. to 850° C.) is carried out for about 0.5 to 30 hours because the homogeneity of the complex oxide is enhanced. Here, the primary particle diameter of the complex oxide can be controlled by adjusting the temperature of preheating or burning and the period for these treatments, whereas the secondary particle diameter thereof can be controlled by the degree of mechanical pulverizing and sieving.

It is also desirable that Ni, Mn and the element M have a valence of 2, 4 and 3 respectively so that the compound is stabilized. Here, the valence of each element can be measured by X-ray absorption spectroscopy (XAS).

By using the lithium-containing complex oxide mentioned above as a positive active material, a non-aqueous secondary battery is produced, for example, as follows.

A positive electrode may be a positive electrode mixture used as a compact, which is obtained by adding, if required, a conductive assistant such as scaly graphite or acetylene black and a binder such as polytetrafluoroethylene or vinylidene polyfluoride to the above-mentioned complex oxide. Alternatively, the positive electrode may be the positive electrode mixture integrated with, by coating, a substrate that also functions as a charge collector. Examples of the substrate include a net of metal such as aluminum, stainless steel, titanium and copper; punching metal, expanded metal, foamed metal, metal foil, and the like.

Incidentally, although the above-described lithium-containing complex oxide can be used alone as an active material, the above-described lithium-containing complex oxide and a lithium-containing complex oxide having a smaller mean particle diameter are allowed to coexist by, for example, mixing them together, thereby further improving the filling property of the active material, increasing an electrode capacity. This is because the lithium-containing complex oxide having a smaller mean particle diameter enters gaps between the particles of the lithium-containing complex oxide of the present invention so as to increase the density of the positive electrode mixture.

It is desirable that, when the above-described lithium-containing complex oxide is expressed by A and the lithium-containing complex oxide having a smaller mean particle diameter to coexist with A is expressed by B, the mean particle diameter of the lithium-containing complex oxide B is not greater than 3/5 of that of the secondary particles of the lithium-containing complex oxide A. If the mean particle diameter of B is larger than the above-noted value, in other words, the difference in the mean particle diameters of A and B is small, the effect described above is small, so that there is no big difference from the case of using A alone. The lower limit of the mean particle diameter of B is considered to be about 0.1 μm, and if the value is smaller than this, the property as an active material degrades, so that the effect of coexistence is unlikely to be produced. It should be noted that the mean particle diameter of B mentioned above means a mean diameter of primary particles when B is in the form of primary particles and a mean diameter of secondary particles when B is in the form of secondary particles formed of flocculated primary particles. Also, for the same reason as the case of A, it is desirable that B is also a complex oxide of secondary particles formed of flocculated primary particles.

The lithium-containing complex oxide B may have a composition that is the same as or different from the lithium-containing complex oxide A. When the lithium-containing complex oxide A and the lithium-containing complex oxide B have the same composition, the lithium-containing complex oxide B can be obtained by pulverizing and, if necessary, putting the lithium-containing complex oxide A through a sieve.

When they have different compositions, the lithium-containing complex oxide B preferably can be a complex oxide represented by General Formula: $Li_{1+a+b}R_{1-a}O_2$ (where $0 \leq a \leq 0.05$ and $-0.05 \leq a+b \leq 0.05$, and R is at least one element selected from the group consisting of Mg, Ti, Cr, Fe, Co, Cu, Zn, Al, Ge, Zr and Sn). In particular, when R contains at least Co, it is possible to improve the electrical conductivity of the electrode that uses the lithium-containing complex oxide A having a smaller electrical conductivity than $LiCoO_2$.

It is desirable that the lithium-containing complex oxide B is contained in a ratio of 10% to 40% by weight with respect to the whole of the lithium-containing complex oxide A and the lithium-containing complex oxide B. This is because the ratio smaller than 10% by weight brings about no large difference from the case of using the lithium-containing complex oxide A alone and that larger than 40% by weight decreases the ratio of the lithium-containing complex oxide A, reducing the effect thereof.

Furthermore, as a negative active material to be opposed to the positive electrode, lithium or a lithium alloy such as a Li—Al alloy, a Li—Pb alloy, a Li—In alloy or a Li—Ga alloy; elements capable of forming an alloy with lithium such as Si, Sn, and a Mg—Si alloy; or an alloy containing these elements can be used in general. Furthermore, a carbon material such as graphite and fibrous carbon, a lithium-containing complex nitride, and the like can be used in addition to an oxide material such as a Sn oxide, a Si oxide and $Li_4Ti_5O_{12}$. Furthermore, the above-mentioned plurality of materials may be combined and used as the active material. The same method as that of the positive electrode also applies to the production of the negative electrode.

Although varied depending upon the kind of a negative active material, the quantity ratio of the positive active material to the negative active material generally is set as positive active material/negative active material=1.5 to 3.5 (weight ratio), whereby the characteristics of the positive active material can be utilized.

Examples of a non-aqueous electrolyte in the non-aqueous secondary battery of the present invention include an organic solvent type liquid electrolyte in which an electrolyte is dissolved in an organic solvent (i.e., an electrolyte solution), a polymer electrolyte in which the electrolyte solution is held in a polymer, and the like. Although there is no particular limit to an organic solvent contained in the electrolyte solution or the polymer electrolyte, it is preferable that the organic solvent contains a chain ester in terms of the load characteristics. Examples of the chain ester include chain carbonate such as dimethyl carbonate, diethyl carbonate and ethyl methyl carbonate; ethyl acetate; and methyl propionate. These chain esters may be used alone or in combination. Particularly, in order to enhance low-temperature characteristics, it is preferable that the above-mentioned chain ester occupies at least 50% by volume of the entire organic solvent. It is particularly preferable that the chain ester occupies at least 65% by volume of the entire organic solvent.

The organic solvent preferably is composed of the above-mentioned chain ester mixed with another ester having a high dielectric constant (30 or more), so as to enhance a discharge capacity, instead of being composed of only the above-mentioned chain ester. Specific examples of such an ester include γ-butyrolactone, ethylene glycol sulfite, cyclic carbonate such as ethylene carbonate, propylene carbonate, butylene carbonate and vinylene carbonate, and the like. In particular, an ester with a cyclic structure such as ethylene carbonate or propylene carbonate is preferable.

An ester with such a high dielectric constant is contained preferably in an amount of at least 10%, more preferably at least 20% by volume, based on the entire organic solvent, in terms of the discharge capacity. Furthermore, in terms of the load characteristics, the ester is contained preferably in an amount of not greater than 40%, more preferably not greater than 30% by volume.

Furthermore, examples of the solvent that can be used other than the ester having a high dielectric constant include 1,2-dimethoxyethane, 1,3-dioxolane, tetrahydrofuran, 2-methyl-tetrahydrofuran, diethylether, and the like. In addition, an amineimide type organic solvent, a sulfur-containing or fluorine-containing organic solvent, and the like can be used.

As an electrolyte to be dissolved in the organic solvent, for example, $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$), and the like are used alone or in combination. Among them, $LiPF_6$, $LiC_4F_9SO_3$, and the like that allow satisfactory charge/ discharge characteristics to be obtained are used preferably. Although there is no particular limit to the concentration of the electrolyte in the electrolyte solution, the concentration is preferably about 0.3 to 1.7 mol/dm$^3$, more preferably about 0.4 to 1.5 mol/dm$^3$.

Furthermore, for the purpose of enhancing the safety and storage characteristics of a battery, an aromatic compound may be contained in a non-aqueous electrolyte solution. As the aromatic compound, benzenes having an alkyl group such as cyclohexylbenzene and t-butylbenzene, biphenyl, or fluorobenzenes are used preferably.

It is preferable that a separator has sufficient strength and is capable of holding a large quantity of electrolyte solution. In view of this, a micro-porous film made of polypropylene, polyethylene, polyolefin such as a copolymer of propylene and ethylene, a nonwoven fabric, and the like with a thickness of 5 to 50 μm are used preferably. Particularly, in the case of using a thin separator with a thickness of 5 to 20 μm, battery characteristics such as a charge/discharge cycle and high-temperature storage are likely to be degraded, and the safety also decreases. However, since the battery using a positive electrode containing the lithium-containing complex oxide of the present invention is excellent in stability and safety, even if such a thin separator is used, a battery is allowed to function with stability.

The following is a description of a method for synthesizing a lithium-containing complex oxide used as the active material for electrode according to the present invention and examples of using this for a non-aqueous secondary battery. It should be noted that the present invention is not limited to these examples. In the examples below, the particle diameter of primary particles was measured using a microphotograph taken with a scanning electron microscope of a magnification of 10,000 times, whereas the particle diameter of secondary particles was measured by a laser-diffraction-type particle size distribution measurement method using a particle size analyzer MICROTRAC HRA (Model: 9320-X100) manufactured by Microtrac, Inc. Further, the BET specific surface area was measured using a BET surface area analyzer ASAP2000 manufactured by Micromeritics Instrument Corporation.

Furthermore, in order to measure the energy state of each element of the complex oxide and determine their valence, XAS measurements were carried out. XAS measurements were carried out in Ritsumeikan University, Synchrotron Radiation Center, BL4 port (Compact SR source: AURORA, the beam energy of 575 MeV and the beam current of 300 mA). White X-rays were monochromatized by Ge(220) double crystal. The energy calibrations were monitored using Ni and Mn foils. In measurement for Co and Ni K-edge spectra, the X-ray intensities were monitored using ionization chambers filled with a mixture of Ar (50%)/N$_2$ (50%) for the incident beam and a mixture of Ar (50%)/N$_2$ (50%) for the transmitted beam. In measurement for Mn K-edge spectra, the ionization chambers were filled with a mixture of Ar (85%)/N$_2$ (15%) for the incident beam and Ar (50%)/N$_2$ (50%) for the transmitted beam. The data obtained was analyzed by using a software of REX2000 (RIGAKU DENKI).

SYNTHESIS EXAMPLE 1

A sodium hydroxide aqueous solution and an aqueous ammonia were added to an aqueous solution containing nickel sulfate and manganese sulfate in a mole ratio of 1:1, and while strongly stirring this, a coprecipitated hydroxide containing Ni and Mn in a ratio of 1:1 was synthesized. After drying, 0.2 mol of this coprecipitated hydroxide and 0.198 mol of LiOH.H$_2$O were weighed and mixed together. This mixture was dispersed in ethanol to form a slurry, mixed using a planet type ball mill for 40 minutes and then dried at room temperature, thereby preparing a uniformly mixed mixture. Subsequently, this mixture was put in a crucible made of alumina and heated to 700° C. at an air flow of 1 dm$^3$/min. The mixture was kept at that temperature for 2 hours, whereby preheating was conducted. The temperature was raised further to 900° C., and the mixture was burnt for 12 hours so as to allow a reaction, thus obtaining a complex oxide. The synthesized complex oxide was pulverized and further put through a sieve, thereby obtaining a lithium-containing complex oxide represented by General Formula: LiNi$_{0.5}$Mn$_{0.5}$O$_2$, where the mean particle diameter of primary particles was 1 μm, the mean particle diameter of secondary particles was 10 μm and the BET specific surface area was 0.9 m$^2$ g.

SYNTHESIS EXAMPLE 2

A lithium-containing complex oxide represented by General Formula: LiNi$_{0.5}$Mn$_{0.5}$O$_2$, where the mean particle diameter of primary particles was 3 μm, the mean particle diameter of secondary particles was 10 μm and the BET specific surface area was 0.7 m$^2$/g was obtained in a manner similar to Synthesis Example 1 except that the burning temperature was set at 1000° C. and the burning period was set for 20 hours.

SYNTHESIS EXAMPLES 3 TO 9

Complex oxides were synthesized at various burning temperatures and for various burning periods, and the resultant complex oxides were pulverized and further put through a sieve, thereby obtaining lithium-containing complex oxides as shown in Table 1. Those having ordinary skill in the art will appreciate that such complex oxides may be manufactured according to a number of known techniques. As the coprecipitated hydroxide, a hydroxide containing Ni, Mn and Co in a ratio of 5:5:2 was used in Synthesis Example 5 and a hydroxide containing Ni, Mn and Co in a ratio of 1:1:1 was used in Synthesis Example 6.

The complex oxide of Synthesis Example 1 and that of Synthesis Example 6 were subjected to the XAS measurements, thus determining the valence of each element. NiO, LiNi$_{0.8}$Co$_{0.2}$O$_2$, MnO, Mn$_2$O$_3$, MnO$_2$, LiMnO$_2$, LiMn$_2$O$_4$ and LiCoO$_2$ were used as reference samples for determining the valences of Ni, Mn and Co.

In both of the complex oxides of Synthesis Examples 1 and 6, Ni and Mn had substantially the same K-edge positions as NiO and MnO$_2$, respectively. Thus, it was found that Ni had a valence of 2 and Mn had a valence of 4 in these oxides. Also, since Co in the complex oxide of Synthesis Example 6 had the same K-edge position as LiCoO$_2$, it was found that Co had a valence of 3.

COMPARATIVE SYNTHESIS EXAMPLE 1

By a conventional method, LiCoO$_2$ having a mean primary particle diameter of 0.7 μm, a mean secondary particle diameter of 7 μm and a BET specific surface area of 0.6 m$^2$/g was obtained.

COMPARATIVE SYNTHESIS EXAMPLE 2

By a conventional method, $LiMn_2O_4$ having a mean primary particle diameter of 1 μm, a mean secondary particle diameter of 12 μm and a BET specific surface area of 1.8 $m^2/g$ was obtained.

The results above are all shown in Table 1.

TABLE 1

| | | Mean particle diameter (μm) | | Specific surface | Positive electrode mixture |
|---|---|---|---|---|---|
| | Composition | Primary particles | Secondary particles | area ($m^2/g$) | density ($g/cm^3$) |
| Synthesis Example 1 | $LiNi_{0.5}Mn_{0.5}O_2$ | 1 | 10 | 0.9 | 3.0 |
| Synthesis Example 2 | $LiNi_{0.5}Mn_{0.5}O_2$ | 3 | 10 | 0.7 | 3.0 |
| Synthesis Example 3 | $LiNi_{0.5}Mn_{0.5}O_2$ | 0.8 | 7 | 1.3 | 3.0 |
| Synthesis Example 4 | $LiNi_{0.5}Mn_{0.5}O_2$ | 0.7 | 6 | 1.7 | 2.9 |
| Synthesis Example 5 | $LiNi_{0.42}Mn_{0.42}Co_{0.16}O_2$ | 1 | 8 | 0.6 | 3.0 |
| Synthesis Example 6 | $LiNi_{0.33}Mn_{0.33}Co_{0.33}O_2$ | 1 | 10 | 0.9 | 3.0 |
| Synthesis Example 7 | $LiNi_{0.5}Mn_{0.5}O_2$ | 1 | 3 | 0.9 | 2.5 |
| Synthesis Example 8 | $LiNi_{0.5}Mn_{0.5}O_2$ | 0.7 | 4 | 2.1 | 2.6 |
| Synthesis Example 9 | $LiNi_{0.5}Mn_{0.5}O_2$ | 0.2 | 7 | 2.8 | 2.5 |
| Comparative Synthesis Example 1 | $LiCoO_2$ | 0.7 | 7 | 0.6 | 3.2 |
| Comparative Synthesis Example 2 | $LiMn_2O_4$ | 1 | 12 | 1.8 | 2.6 |

Using the lithium-containing complex oxides of Synthesis Examples 1 to 9 and Comparative Synthesis Examples 1 to 2 described above as a positive active material, non-aqueous secondary batteries were produced. After 94 parts by weight of the lithium-containing complex oxide and 3 parts by weight of carbon black were dry-blended, a binder solution prepared by dissolving polyvinylidene fluoride in N-methyl-2-pyrrolidone was added so that 3 parts by weight polyvinylidene fluoride was present. Additional N-methyl-2-pyrrolidone was then added and mixed sufficiently to prepare a paste. Depending on the amount produced, the amount of N-methyl-2-pyrrolidone required to produce a paste varies. However, the specific consistency of the paste is not critical. The resultant coating paste was applied uniformly to both surfaces of a 20 μm thick aluminum foil and dried, compressed with a roller press and cut into a size of 280 mm×38 mm, thereby producing a belt-like positive electrode having a thickness of about 170 μm. In addition, a mixture layer of each of the obtained positive electrodes was weighed, from which the density of the positive electrode mixture was determined and also shown in Table 1.

As becomes clear from Table 1, the lithium-containing complex oxides of Synthesis Examples 1 to 9 is a complex oxide within a composition range represented by General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$ (when $0 \leq y \leq 0.2$) or $-0.24 \leq \delta \leq 0.24$ (when $0.2 < y \leq 0.4$); and M is at least one element selected from the group consisting of Mg, Ti, Cr, Fe, Co, Cu, Zn, Al, Ge, Zr and Sn), in which secondary particles are formed of flocculated primary particles. Also, in the complex oxides of Synthesis Examples 1 to 6 whose primary particles have a mean particle diameter ranging from 0.3 to 3 μm and secondary particles have a mean particle diameter ranging from 5 to 20 μm, the mixture density of the formed positive electrode (at least 2.9 $g/cm^3$) was at substantially the same level as conventionally-used $LiCoO_2$ of Comparative Synthesis Example 1 and achieved improved filling property. On the other hand, even within the above-noted composition range, the mixture density was found to be lower than the above and at substantially the same level as $LiMn_2O_4$ of Comparative Synthesis Example 2 if the primary particles or the secondary particles had a mean particle diameter beyond the scope of claims of the present invention.

Next, a paste in which 92 parts by weight of natural graphite, 3 parts by weight of low-crystalline carbon and 5 parts by weight of polyvinylidene fluoride were mixed was applied uniformly to both surfaces of a 10 μm thick copper foil and dried, compressed with a roller press and cut into a size of 310 mm×41 mm, thereby producing a belt-like negative electrode having a thickness of about 165 μm.

A separator made of a 20 μm thick microporous polyethylene film was placed between the belt-like positive electrode and the belt-like negative electrode described above and wound spirally, thus forming an electrode body. Thereafter, the electrode body was inserted into a cylindrical battery case with a bottom having an outer diameter of 14 mm and a height of 51.5 mm, and a positive electrode lead and a negative electrode lead were welded. Subsequently, 1.7 $cm^3$ of a non-aqueous electrolyte solution prepared by dissolving $LiPF_6$ in a concentration of 1.2 $mol/dm^3$ in a mixed solvent containing ethylene carbonate and ethyl methyl carbonate in a volume ratio of 1:2 was poured into the battery case. The weight ratio of the positive active material to the negative active material described above (positive active material/negative active material) was 1.9 in the electrode body using the lithium-containing complex oxide of Synthesis Examples 1 to 9, 2.1 in the electrode body using that of Comparative Synthesis Example 1 and 2.6 in the electrode body using that of Comparative Synthesis Example 2.

The opening of the above-described battery case was sealed by a general method, thus producing a cylindrical non-aqueous secondary battery. The discharge capacity of this non-aqueous secondary battery was measured as follows. The battery was charged up to 4.2 V at a constant current of 600 mA in an atmosphere of 20° C. and then charged by a constant voltage system so that a total charging period reached 2.5 hours. Then, the discharge capacity was measured when the battery was discharged down to 3.0 V at a constant current of 120 mA. The result is shown Table 2.

TABLE 2

| Active material | Discharge capacity (mAh) |
| --- | --- |
| Synthesis Example 1 | 602 |
| Synthesis Example 2 | 601 |
| Synthesis Example 3 | 602 |
| Synthesis Example 4 | 586 |
| Synthesis Example 5 | 604 |
| Synthesis Example 6 | 604 |
| Synthesis Example 7 | 483 |
| Synthesis Example 8 | 493 |
| Synthesis Example 9 | 422 |
| Comparative Synthesis Example 1 | 620 |
| Comparative Synthesis Example 2 | 510 |

Because of a large filling density of the positive electrode mixture, the batteries respectively using the lithium-containing complex oxides of Synthesis Examples 1 to 6 alone showed a large discharge capacity as in the battery of Comparative Synthesis Example 1 using $LiCoO_2$. On the other hand, since the batteries respectively using the lithium-containing complex oxides of Synthesis Examples 7 to 9 alone had a low filling property of the active material, they achieved only a low discharge capacity as in the battery of Comparative Synthesis Example 2 using $LiMn_2O_4$.

Furthermore, the batteries respectively using the lithium-containing complex oxides of Synthesis Examples 1 and 6 and Comparative Synthesis Examples 1 and 2 alone were evaluated for cycle characteristics. Each battery was subjected to charge/discharge cycles consisting of charging at 20° C. under a condition similar to the above and discharging down to 3.0 V at a constant current of 600 mA. The cycle characteristics at room temperature were evaluated based on the ratio (capacity retention ratio (%)) of a discharge capacity after 100 cycles with respect to a discharge capacity in an initial stage of the cycle. Moreover, by conducting the above-described cycle test also at 60° C., the cycle characteristics at a high temperature were evaluated based on the ratio (capacity retention ratio (%)) of a discharge capacity after 20 cycles.

Additionally, the storage characteristics were evaluated as follows. After 5 charge/discharge cycles under the same charging/discharging condition as in the above-described cycle characteristics measurement, each battery was charged under the above-described charging condition and stored at 60° C. for 20 days. After this storage, the battery was discharged under the above condition, and then the ratio (capacity retention ratio (%)) of a capacity remaining after the storage with respect to a capacity before the storage was measured. After the measurement, 1 charge/discharge cycle was conducted, and the ratio (capacity recovery ratio (%)) of a capacity after the storage with respect to a capacity before the storage was measured. Based on these capacity retention ratio and capacity recovery ratio, the storage characteristics at a high temperature were evaluated. The results are shown in Table 3.

TABLE 3

| Active material | Cycle characteristics/ capacity retention (%) | | Storage characteristics | |
| --- | --- | --- | --- | --- |
| | 20° C. | 60° C. | Capacity retention (%) | Capacity recovery (%) |
| Synthesis Example 1 | 93 | 98 | 88 | 99 |
| Synthesis Example 6 | 95 | 98 | 87 | 99 |
| Comparative Synthesis Example 1 | 90 | 94 | 80 | 94 |
| Comparative Synthesis Example 2 | 75 | 92 | 72 | 82 |

As becomes clear from Table 3, by using the lithium-containing complex oxide of Synthesis Example 1 and that of Synthesis Example 6 for the positive electrode, the batteries with excellent cycle characteristics and storage characteristics were obtained. On the other hand, the batteries respectively using $LiCoO_2$ and $LiMn_2O_4$ alone had poorer cycle characteristics and storage characteristics than those using lithium-containing complex oxides of the present invention. In order to look into the cause, the following experiments were conducted. The positive electrodes respectively using the lithium-containing complex oxides of Synthesis Example 1 and Comparative Synthesis Examples 1 and 2 were cut into a piece with a diameter of 15 mm in an argon atmosphere, dipped in 5 cm³ electrolyte solution and kept at 60° C. for 5 days. The resultant electrolyte solution was subjected to ICP Spectrometry (Inductively Coupled Plasma Spectrometry), thus determining the concentration of Mn and Co eluted into the electrolyte solution. The value of the elution amount converted into the value per gram of complex oxide is shown in Table 4.

TABLE 4

| | Elution amount per gram of complex oxide (μg) | |
| --- | --- | --- |
| | Mn | Co |
| Synthesis Example 1 | 4.9 | — |
| Comparative Synthesis Example 1 | — | 18.7 |
| Comparative Synthesis Example 2 | 35.7 | — |

It was found that the Mn elution amount of the lithium-containing complex oxide of Synthesis Example 1 was an order of magnitude smaller than that of $LiMn_2O_4$ of Comparative Synthesis Example 2 and that, even when stored at a high temperature, the dissolution of Mn into the electrolyte solution was suppressed sufficiently. Since the Mn elution amount of Synthesis Example 1 was smaller than the Co elution amount of $LiCoO_2$ of Comparative Synthesis Example 1, it was found that the lithium-containing complex oxide had an excellent durability at a high temperature. $LiMn_2O_4$ is known to have considerably deteriorated capacity after charge/discharge cycles at a high temperature and after stored at a high temperature because Mn dissolution occurs at a high temperature, and this is confirmed by the result shown in Table 4. On the other hand, $LiCoO_2$ is a material that does not easily cause such a problem, but it is clearly shown that the lithium-containing complex oxides of the present invention are even better than this $LiCoO_2$.

EXAMPLE 1

The lithium-containing complex oxide synthesized in Synthesis Example 1 was pulverized until its secondary particles had a mean particle diameter of 5 μm, and then put through a sieve, thereby obtaining a lithium-containing complex oxide B. Next, a lithium-containing complex oxide A of Synthesis Example 1 and the above-mentioned lithium-containing complex oxide B were mixed together in a weight ratio of 60:40 and used as a positive active material, thereby producing a non-aqueous secondary battery similar to that described above.

EXAMPLE 2

A non-aqueous secondary battery was produced in a manner similar to Example 1 except that the mean particle diameter of the secondary particles of the lithium-containing complex oxide B was set to be 3 μm.

EXAMPLE 3

A non-aqueous secondary battery was produced in a manner similar to Example 2 except that the weight ratio of the lithium-containing complex oxide A to the lithium-containing complex oxide B was set to be 80:20.

EXAMPLE 4

A non-aqueous secondary battery was produced in a manner similar to Example 2 except that the weight ratio of the lithium-containing complex oxide A to the lithium-containing complex oxide B was set to be 95:5.

EXAMPLE 5

A non-aqueous secondary battery was produced in a manner similar to Example 1 except that the mean particle diameter of the secondary particles of the lithium-containing complex oxide B was set to be 7 μm.

With respect to Examples 1 to 5, similarly to the above, the positive electrode mixture density before battery assembly and the discharge capacity of the non-aqueous secondary batteries were measured as well. The results thereof are shown in Table 5 together with the result when using the lithium-containing complex oxide of Synthesis Example 1 alone. As becomes clear from Table 5, in the non-aqueous secondary batteries of Examples 1 to 3 that use the mixture of the lithium-containing complex oxide A and the lithium-containing complex oxide B whose mean particle diameter is not greater than ⅗ of the mean particle diameter of the secondary particles of the lithium-containing complex oxide A, the positive electrode mixture density increased and the filling property of the active material improved, leading to a larger discharge capacity of the batteries. On the other hand, the non-aqueous secondary batteries in Example 4 in which the mixed ratio of the lithium-containing complex oxide B was small and Example 5 in which the mean particle diameter of the lithium-containing complex oxide B was substantially the same as that of the lithium-containing complex oxide A, the positive electrode mixture density and discharge capacity were at substantially the same level as those of the battery using the lithium-containing complex oxide A of Synthesis Example 1 alone. Accordingly, the effect of mixing the active material was not shown clearly.

TABLE 5

| | Mean particle diameter of complex oxide B (μm) | Mean particle diameter of B/ mean particle diameter of A | Ratio of B (wt %) | Positive electrode mixture density (g/cm³) | Discharge capacity (mAh) |
|---|---|---|---|---|---|
| Synthesis Example 1 | — | — | 0 | 3.0 | 602 |
| Example 1 | 5 | 5/10 | 40 | 3.1 | 620 |
| Example 2 | 3 | 3/10 | 40 | 3.2 | 633 |
| Example 3 | 3 | 3/10 | 20 | 3.2 | 635 |
| Example 4 | 3 | 3/10 | 5 | 3.0 | 605 |
| Example 5 | 7 | 7/10 | 40 | 3.0 | 602 |

As described above, according to the present invention, by using a lithium-containing complex oxide having a high filling property, excellent cycle durability at a high temperature and excellent stability during high-temperature storage, it is possible to provide a non-aqueous secondary battery having a high capacity, excellent cycle durability and excellent storage characteristics at a high temperature. Furthermore, since the lithium-containing complex oxide used in the present invention contains Mn and Ni, which are naturally more abundant and more inexpensive compared with Co, as a main constituent element, it is suitable for mass production and can contribute to the cost reduction of batteries.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An active material for an electrode, comprising:
 a lithium-containing complex oxide A represented by General Formula: $Li_{1+x+\alpha}Ni_{(1-x-y-\delta)/2}Mn_{(1-x-y-\delta)/2}M_yO_2$ (where $0 \leq x \leq 0.15$, $-0.05 \leq x+\alpha \leq 0.2$, $0 \leq y \leq 0.4$; $-0.1 \leq \delta \leq 0.1$; and M is at least one element selected from the group consisting of Mg, Ti, Cr, Fe, Co, Cu, Zn, Al, Ge, Zr and Sn), the lithium-containing complex oxide A comprising secondary particles formed of flocculated primary particles, the secondary particles having a mean particle diameter of 5 to 20 μm, Mn having an average valance of 3.3 to 4; and
 a lithium-containing complex oxide B having a mean particle diameter smaller than the mean particle diameter of the secondary particles of the lithium-containing complex oxide A, the lithium-containing complex oxide B having a different composition from the lithium-containing complex oxide A and being represented by General Formula: $Li_{1+a+b}R_{1-a}O_2$ (where $0 \leq a \leq 0.05$ and $-0.05 \leq a+b \leq 0.05$; and R is Co and at least one element selected from the group consisting of Mg, Ti, Cr, Fe, Cu, Zn, Al, Ge, and Sn).

2. The active material for an electrode according to claim 1, wherein $x \leq 0.05$ and $x+\alpha \leq 0.05$.

3. The active material for an electrode according to claim 1, wherein the lithium-containing complex oxide B is contained in a ratio of 10% to 40% by weight with respect to a whole of the lithium-containing complex oxide A and the lithium-containing complex oxide B.

4. The active material for an electrode according to claim 1, wherein the mean particle diameter of the lithium-containing complex oxide B is not greater than 3/5 of that of the secondary particles of the lithium-containing complex oxide A.

5. The active material for an electrode according to claim 1, wherein in the General Formula, y>0 and M is one or more elements containing at least Co.

6. The active material for an electrode according to claim 1, wherein the lithium-containing complex oxide A has a BET specific surface area of 0.3 to 2 $m^2/g$.

7. The active material for an electrode according to claim 1, wherein the lithium-containing complex oxide B is a complex oxide of secondary particles formed of flocculated primary particles.

8. The active material for an electrode according to claim 1, wherein Ni, Mn and the element M of the lithium-containing complex oxide A have a valence of 2, 4 and 3 respectively.

9. A non-aqueous secondary battery comprising:
a positive electrode comprising a positive electrode mixture comprising the active material for an electrode according to claim 1;
a negative electrode; and
a non-aqueous electrolyte.

10. The non-aqueous secondary battery according to claim 9, wherein $x \leq 0.05$ and $x+\alpha \leq 0.05$.

11. The non-aqueous secondary battery according to claim 9, wherein the lithium-containing complex oxide B is contained in a ratio of 10% to 40% by weight with respect to a whole of the lithium-containing complex oxide A and the lithium-containing complex oxide B.

12. The non-aqueous secondary battery according to claim 9, wherein the mean particle diameter of the lithium-containing complex oxide B is not greater than 3/5 of that of the secondary particles of the lithium-containing complex oxide A.

13. The non-aqueous secondary battery according to claim 9, wherein in the General Formula, y>0 and M is one or more elements containing at least Co.

14. The non-aqueous secondary battery according to claim 9, wherein the lithium-containing complex oxide A has a BET specific surface area of 0.3 to 2 $m^2/g$.

15. The non-aqueous secondary battery according to claim 9, wherein the lithium-containing complex oxide B is a complex oxide of secondary particles formed of flocculated primary particles.

16. The non-aqueous secondary battery according to claim 9, wherein Ni, Mn and the element M of the lithium-containing complex oxide A have a valence of 2, 4 and 3, respectively.

17. The active material for an electrode according to claim 1, wherein a composition of the lithium-containing complex oxide A is in a vicinity of a composition represented by $LiNi_{5/12}Mn_{5/12}M_{1/6}O_2$.

18. The active material for an electrode according to claim 1, wherein a composition of the lithium-containing complex oxide A is in a vicinity of a composition represented by $LiNi_{1/3}Mn_{1/3}M_{1/3}O_2$.

19. A non-aqueous secondary battery comprising:
a positive electrode comprising a positive electrode mixture comprising the active material for an electrode according to claim 17;
a negative electrode and
a non-aqueous electrolyte.

20. A non-aqueous secondary battery comprising:
a positive electrode comprising a positive electrode mixture comprising the active material for an electrode according to claim 18;
a negative electrode; and
a non-aqueous electrolyte.

21. A non-aqueous secondary battery comprising:
a positive electrode comprising a positive electrode mixture comprising as a positive active material a lithium-containing complex oxide represented by General Formula: $Li_{1+x+\alpha}Ni_{(1-x-y+\delta)/2}Mn_{(1-x-y-\delta)/2}M_yO_2$ (where $0 \leq x \leq 0.15$, $-0.05 \leq x+\alpha \leq 0.2$, $0.16 \leq y \leq 0.4$; $-0.1 \leq \delta \leq 0.1$; and M is at least one element selected from the group consisting of Mg, Ti, Cr, Fe, Co, Cu, Zn, Al, Ge, Zr and Sn), the lithium-containing complex oxide comprising secondary particles formed of flocculated primary particles;
a negative electrode; and
a non-aqueous electrolyte;
wherein the primary particles have a mean particle diameter of 0.3 to 3 μm,
the secondary particles have a mean particle diameter of 5 to 20 μm, and the lithium-containing complex oxide has a BET specific surface area of 0.3 to 2 $m^2/g$, and wherein the positive electrode mixture contains a binder and has a density of at least 2.9 $g/cm_3$ wherein the positive electrode comprises a positive active material having a different composition and smaller mean particle diameter from the lithium-containing complex oxide represented by the General Formula and wherein the positive electrode comprises a lithium-containing complex oxide represented by General Formula: $Li_{1+a+b}R_{1-a}O_2$ (where $0 \leq a \leq 0.05$ and $-0.05 \leq a+b \leq 0.05$, and R is at least one element selected from the group consisting of Mg, Ti, Cr, Fe, Co, Cu, Zn, Al, Ge, Zr and Sn).

22. The non-aqueous secondary battery according to claim 9, wherein the positive electrode mixture contains a binder and has a density of at least 2.9 $g/cm^3$.

23. A non-aqueous secondary battery comprising:
a positive electrode comprising a positive electrode mixture comprising as a positive active material a lithium-containing complex oxide represented by General Formula: $Li_{1+x+\alpha}Ni_{(1-x-y+\delta)/2}Mn_{1-x-y-\delta)/2}M_yO_2$ (where $0 \leq x \leq 0.15$, $-0.05 \leq x+\alpha \leq 0.2$, $0.16 \leq y \leq 0.4$: $-0.1 \leq \delta \leq 0.1$; and M is at least one element selected from the group consisting of Mg, Ti, Cr, Fe, Co, Cu, Zn, Al, Ge, Zr and Sn), the lithium-containing complex oxide comprising secondary particles formed of flocculated primary particles;
a negative electrode; and
a non-aqueous electrolyte;
wherein the secondary particles having a mean particle diameter of 5 to 20 μm are contained in a ratio of 60% to 90% by weight with respect to a whole of the lithium-containing complex oxide,
the secondary particles having a mean particle diameter of not greater than 3/5 of the mean particle diameter of 5 to2 μm are contained in a ratio of 10% to 40% by weight with respect to the whole of the lithium-containing complex oxide, and the positive electrode mixture contains a binder and has a density of at least 2.9 g/cm$^3$, wherein the positive electrode comprises a positive active material having a different composition and smaller mean particle diameter from the lithium-containing complex oxide represented by the General Formula and wherein the positive electrode comprises a lithium-containing complex oxide represented by General Formula: $Li_{1+a+b}R_{1-a}O_2$ (where $0 \leq a \leq 0.05$ and $-0.05 \leq a+b \leq 0.05$, and R is at least one element selected from the group consisting of Mg, Ti, Cr, Fe, Co, Cu, Zn, Al, Ge, Zr and Sn).

24. The non-aqueous secondary battery according to claim 23, wherein in the General Formula, y>0 and M is one or more elements containing at least Co.

25. The non-aqueous secondary battery according to claim 23, wherein a composition represented by the General Formula is in a vicinity of a composition represented by $LiNi_{1/3}Mn_{1/3}M_{1/3}O_2$.

26. The non-aqueous secondary battery according to claim 23, wherein in the General Formula $Li_{1+a+b}R_{1-a}O_2$, R comprises at least Co.

* * * * *